United States Patent
Chen et al.

(10) Patent No.: US 12,271,621 B2
(45) Date of Patent: Apr. 8, 2025

(54) METHOD, APPARATUS, ELECTRONIC DEVICE AND STORAGE MEDIUM FOR STORING DATA BASED ON DATA SHARD INFORMATION

(71) Applicant: Beijing Volcano Engine Technology Co., Ltd., Beijing (CN)

(72) Inventors: Zhengwen Chen, Beijing (CN); Junsheng Tan, Beijing (CN); Nan Li, Beijing (CN); Xiao Chen, Beijing (CN); Yingju Gao, Beijing (CN); Dong Wang, Beijing (CN)

(73) Assignee: BEIJING VOLCANO ENGINE TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 18/737,702

(22) Filed: Jun. 7, 2024

(65) Prior Publication Data
US 2024/0419355 A1    Dec. 19, 2024

(30) Foreign Application Priority Data
Jun. 15, 2023  (CN) .......................... 202310716317.4

(51) Int. Cl.
*G06F 3/06*    (2006.01)
(52) U.S. Cl.
CPC .......... *G06F 3/0655* (2013.01); *G06F 3/0604* (2013.01); *G06F 3/067* (2013.01)
(58) Field of Classification Search
CPC ....... G06F 3/0655; G06F 3/0604; G06F 3/067
See application file for complete search history.

(56) References Cited

U.S. PATENT DOCUMENTS

| | | | |
|---|---|---|---|
| 8,799,535 B2* | 8/2014 | Hluchyj | G06F 3/0689 370/395.42 |
| 9,836,492 B1 | 12/2017 | Hermanson | |
| 2017/0272100 A1* | 9/2017 | Yanovsky | G06F 12/1408 |
| 2018/0203942 A1* | 7/2018 | Liu | G06F 16/90335 |
| 2020/0133550 A1* | 4/2020 | Willnauer | G06F 16/137 |
| 2021/0303633 A1* | 9/2021 | Irazabal | G06F 16/9014 |
| 2022/0027348 A1 | 1/2022 | Manevich et al. | |
| 2023/0124867 A1 | 4/2023 | Han | |

FOREIGN PATENT DOCUMENTS

CN    113886331 A    1/2022

OTHER PUBLICATIONS

Extended European Search Report for European Patent Application No. 24177040.3, mailed on Oct. 24, 2024, 9 pages.

* cited by examiner

*Primary Examiner* — Mark A Giardino, Jr.
(74) *Attorney, Agent, or Firm* — Astute IP Law Group

(57) ABSTRACT

Embodiments of the present disclosure provide a method, apparatus, electronic device and storage medium for storing data. After target data is obtained, a first data feature of the target data is extracted, the first data feature representing a data volume of the target data; the target shard number is obtained based on the first data feature, the target shard number representing the number of storage units for storing target data; a corresponding storage engine is obtained based on the target shard number, and the target data is stored in the storage engines in shards. The matched target shard number is obtained based on the first data feature of the target data, and a corresponding storage engine for storage is obtained based on the target shard number.

20 Claims, 10 Drawing Sheets

| | DATA DIMENSION A | DATA DIMENSION B | DATA DIMENSION C | DATA DIMENSION D |
|---|---|---|---|---|
| DATA RECORD → | cpu_load | idc=1;host=1.1.1.1 | 20230419-000001 | 5 |
| | cpu_load | idc=1;host=1.1.1.2 | 20230419-000001 | 7 |
| | cpu_load | idc=1;host=1.1.1.1 | 20230419-000002 | 15 |
| | cpu_load | idc=1;host=1.1.1.2 | 20230419-000002 | 16 |
| | …… | …… | …… | …… |

METHOD, APPARATUS, ELECTRONIC DEVICE AND STORAGE MEDIUM FOR STORING DATA BASED ON DATA SHARD INFORMATION

CROSS-REFERENCE

The present application claims priority to Chinese Patent Application No. 202310716317.4, filed on Jun. 15, 2023, and entitled "METHOD, APPARATUS, ELECTRONIC DEVICE AND STORAGE MEDIUM FOR STORING DATA", the entirety of which is incorporated herein by reference.

FIELD

Embodiments of the present disclosure relate to the field of database technologies, and in particular, to a method, apparatus, electronic device and storage medium for storing data.

BACKGROUND

Currently, in an application scenario of large-scale distributed storage, based on an existing design, data that is to be stored is generally segmented, and stored in shards based on a load balancing principle, thereby improving overall performance of a storage system.

However, in the solution of the existing design, the number of shards of target data is fixed, and is usually set fixedly based on the number of available storage units, which easily causes problems such as data hotspots and storage imbalance, and affects overall throughput and read/write performance of a storage system.

SUMMARY

Embodiments of the present disclosure provide a method, apparatus, electronic device and storage medium for storing data, so as to overcome problems such as data hotspots and storage imbalance.

According to a first aspect, an embodiment of the present disclosure provides a method for storing data, including:
reading, from a message queue, target data to be stored in a current cycle, and extracting a first data feature of the target data, the first data feature representing a data volume of the target data; determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and writing, by invoking the data write component, the target data into a corresponding storage engine based on the data shard information, wherein the storage engine supports query processing of the target data.

According to a second aspect, an embodiment of the present disclosure provides an apparatus for storing data, including:
an extraction unit configured for reading, from a message queue, target data to be stored in a current cycle, and extracting a first data feature of the target data, the first data feature representing a data volume of the target data;
a processing unit configured for determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and
a storage unit configured for writing, by invoking the data write component, the target data into a corresponding storage engine based on the data shard information, wherein the storage engine supports query processing of the target data.

According to a third aspect, an embodiment of the present disclosure provides an electronic device, comprising:
a processor and a memory communicatively connected to the processor;
the memory stores computer executable instructions;
the processor executes the computer executable instructions stored in the memory to implement a method in accordance with the foregoing first aspect and various possible designs of the first aspect.

According to a fourth aspect, an embodiment of the present disclosure provides a computer readable storage medium with computer executable instructions stored thereon, wherein the computer executable instructions, when being executed by a processor, implement a method for storing data in accordance with the first aspect and various possible designs of the first aspect.

According to a fifth aspect, an embodiment of the present disclosure provides a computer program product comprising a computer program, wherein the computer program, when being executed by a processor, implements a method for storing data in accordance with the first aspect and various possible designs of the first aspect.

Based on the method, apparatus, electronic device and storage medium for storing data provided by embodiments of the present disclosure, reading, from a message queue, target data to be stored in a current cycle, and extracting a first data feature of the target data, the first data feature representing a data volume of the target data; determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and writing, by invoking the data write component, the target data into a corresponding storage engine based on the data shard information, wherein the storage engine supports query processing of the target data. A first data feature of target data is extracted, the data shard information is obtained based on the first data feature, and a process of storing the target data in shards is performed based on the data shard information. Thereby, an effect of dynamically allocating storage units based on the data volume of the target data is achieved, the problem of a large-volume data set being stored in a single storage unit or a small number of storage units is avoided, thereby avoiding the problem of data hotspots or the like, and thus the overall throughput and read/write performance of the storage system can be improved.

BRIEF DESCRIPTION OF THE DRAWINGS

To describe the technical solutions in the embodiments of the present disclosure or in the prior art more clearly, the following briefly introduces the accompanying drawings required for describing the embodiments or the prior art. Apparently, the accompanying drawings in the following description show some embodiments of the present disclosure, and for those skilled in the art, other drawings may also be obtained based on these accompanying drawings without creative efforts.

DETAILED DESCRIPTION

In order to make objects, technical solutions and advantages of the embodiments of the present disclosure more apparent, the technical solutions in the embodiments of the present disclosure will be described below in a clearly and fully understandable way in combination with the drawings related to the embodiments of the present disclosure. Obviously, the described embodiments are only a part but not all of the embodiments of the present disclosure. All other embodiments obtained by persons of ordinary skill in the art based on the embodiments of the present disclosure without creative efforts shall belong to the scope of protection of the present disclosure.

It should be noted that, the user information (including but not limited to user equipment information, user personal information, and the like) and data (including but not limited to data used for analysis, stored data, displayed data, and the like) involved in the present disclosure are: information and data which are authorized by a user or sufficiently authorized by each party, and collection, use and processing of relevant data need to comply with relevant legal regulations and standards of relevant countries and regions. Additionally, a corresponding operation entry is provided for the user to select authorization or rejection.

Figure 1:
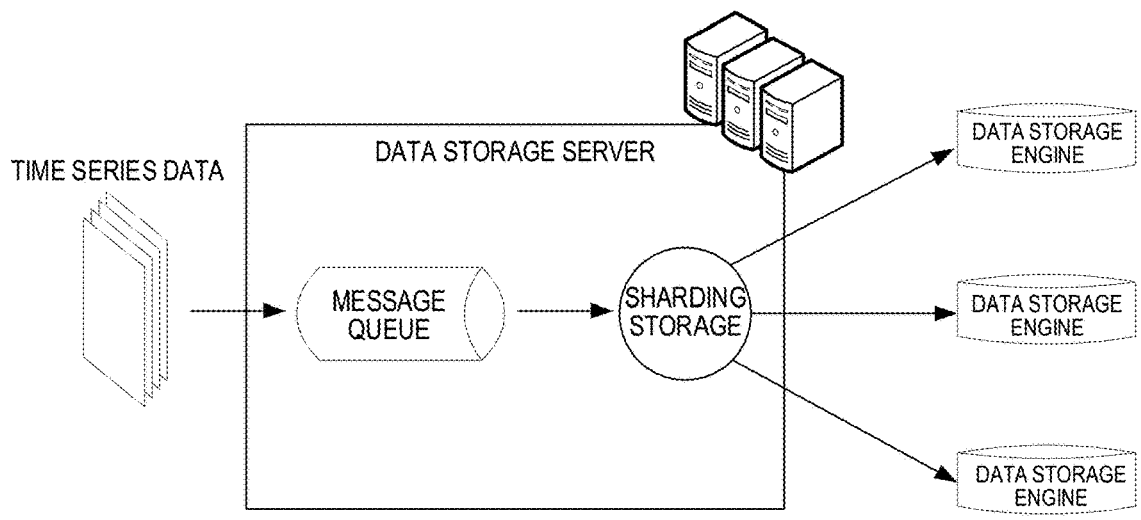
FIG. 1 is an application scenario diagram of a method for storing data according to an embodiment of the present disclosure.

Application scenarios of the embodiments of the present disclosure will be explained below:

FIG. 1 is an application scenario diagram of a method for storing data according to an embodiment of the present disclosure. The method for storing data according to the embodiment of the present disclosure may be applied to an application scenario of distributed storage. Specifically, the present invention may be applied to an application scenario of distributed storage for large-scale time series data, wherein the time series data is data having time sequence information, such as device running data and traffic monitoring data. As shown in FIG. 1, the method provided by the embodiment of the present disclosure may be applied to a data storage server. After receiving and collecting time series data to be stored, the data storage server adds a time stamp based on the time series data to a message queue (Message Queue, MQ). Then, the time series data in the message queue is stored in shards successively, i.e., by means of the method for storing data provided in the embodiments of the present disclosure, the time series data obtained from the message queue is stored in different storage engines, thereby realizing sharding storage of the data and load balancing between various storage engines, and improving the read-write performance of the storage system. The storage engine may be the number of instances of a back-end storage device, or may be the number of physical servers or virtual machines. Alternatively, the storage engine may also be the number of processes, and may be understood as an individual having independent computing and data processing capabilities. Furthermore, based on specific functions, the data storage server may be further divided into a data collection unit and a data storage engine, wherein the data collection unit is used for receiving and collecting target data and storing same in a message queue, and the data storage engine is used for executing the method for storing data provided by the embodiment, and storing the target data in the message queue in a corresponding storage engine. The data collection unit and the data storage engine may be implemented based on the same electronic device, for example, by using the foregoing data storage server, or by using two independent electronic devices, and the data storage server is implemented in aid of communication between the two independent electronic devices.

In an existing design, in an application scenario of large-scale distributed storage, when the data storage server shards or fragments the target data, the target data is usually sharded based on a fixed number of shards, and the number of shards is usually fixedly set based on the number of available storage engines. For example, if the number of available storage engines is 10, the number of slices is set to 10, and target data is evenly distributed to 10 available storage engines for storage. In this way, load balancing between storage engines is achieved. However, in an actual application process, for obtain a storage engine(s) corresponding to target data, hash mapping is generally performed based on a specific label(s) of the target data, so as to obtain a storage engine for storing the target data. For example, a corresponding storage engine is obtained based on a data type label represented by the target data. More specifically, the data type includes CPU running data, network traffic data, and the like. When the data volume of the target data corresponding to the specific label is large (many), a large amount of data is stored in one or more storage engines, thereby causing a problem of a storage hotspot and storage imbalance, and affecting read-write performance and stability of the storage system.

Embodiments of the present disclosure provide a method for storing data to at least solve the above-mentioned problems.

Figure 2:
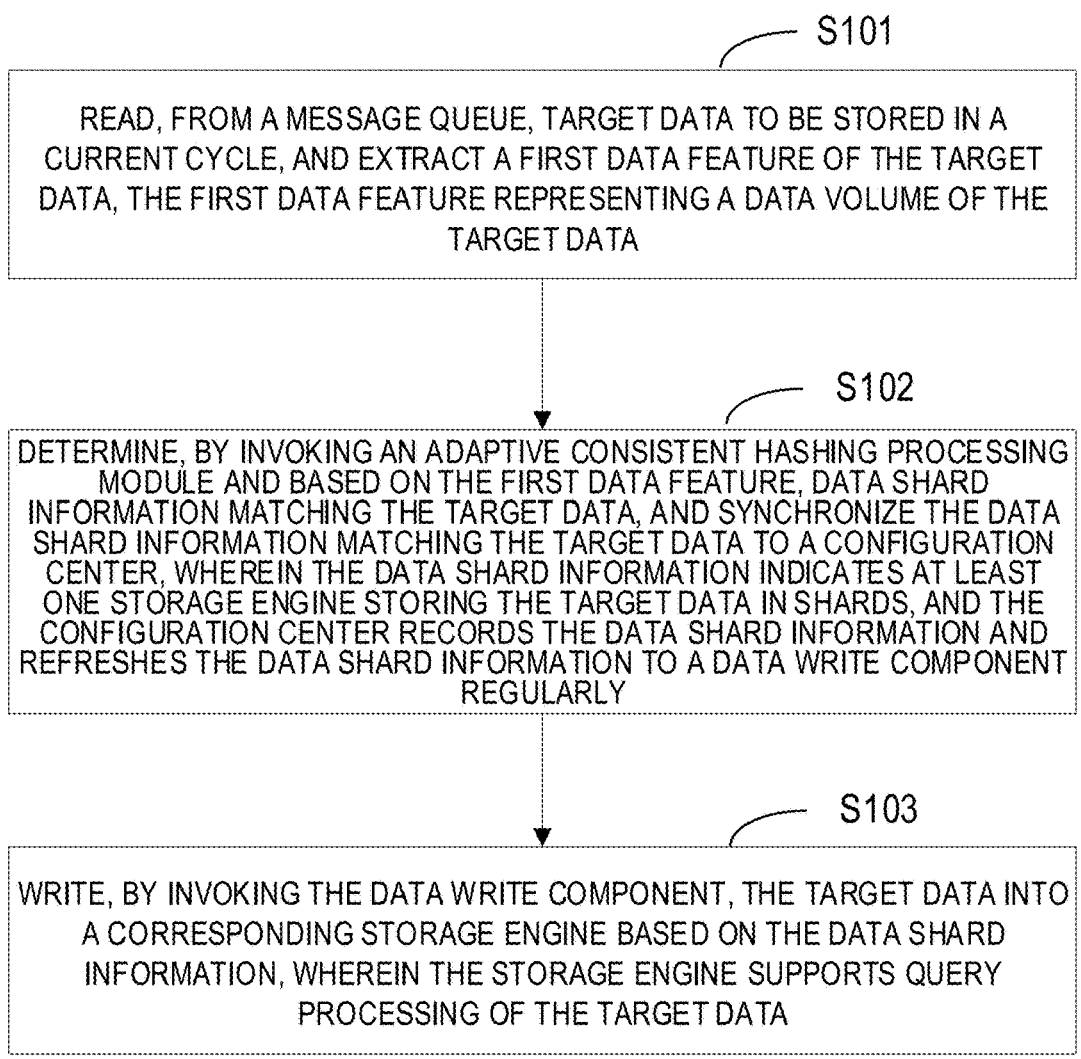
FIG. 2 is a first schematic flowchart of a method for storing data according to an embodiment of the present disclosure.

Referring to FIG. 2, FIG. 2 is a first schematic flowchart of a method for storing data according to an embodiment of the present disclosure. The method of this embodiment may be applied to an electronic device, and the method for storing data includes:

Step S101: reading, from a message queue, target data to be stored in a current cycle, and extracting a first data feature of the target data, the first data feature representing a data volume of the target data.

By way of example, with reference to the schematic diagram of the application scenario shown in FIG. 1, an execution subject of this embodiment may be the data storage server shown in FIG. 1 or an electronic device corresponding to the data storage unit. In this embodiment, by way of example, a data storage server (hereinafter server for short) is used as an execution subject for description.

Specifically, a server reads, from a message queue, target data to be stored in a current cycle, where the target data is a set of a series of sub-data (namely, data records) belonging to the same data type. For example, a set of 100 pieces of device running state information. In a possible implementation, the target data is time series data, and the target data includes a plurality of time series data records, where each time series data record represents recorded information at a time point, for example, device running state information at a time point A.

Furthermore, after obtaining the target data, the server processes the target data, and extracts a first data feature of the target data, that is, the data volume of the target data. For example, the data volume of the target data herein may refer to a data volume (represented by the number of bytes) of the target data as a whole, or may also refer to the number of data records (sub-data) in the target data, or may also refer to the number of data dimensions of the target data. The data dimension refers to different meanings represented by data stored in the target data. For example, the target data includes three data dimensions, i.e., a data dimension A, a data dimension B and a data dimension C, respectively. Data in the data dimension A represents a data type of target data, such as running state data and traffic data; Data in the data dimension B represents an IP address of the device; and data in the data dimension C represents data generation time.

Figures 3, 4:
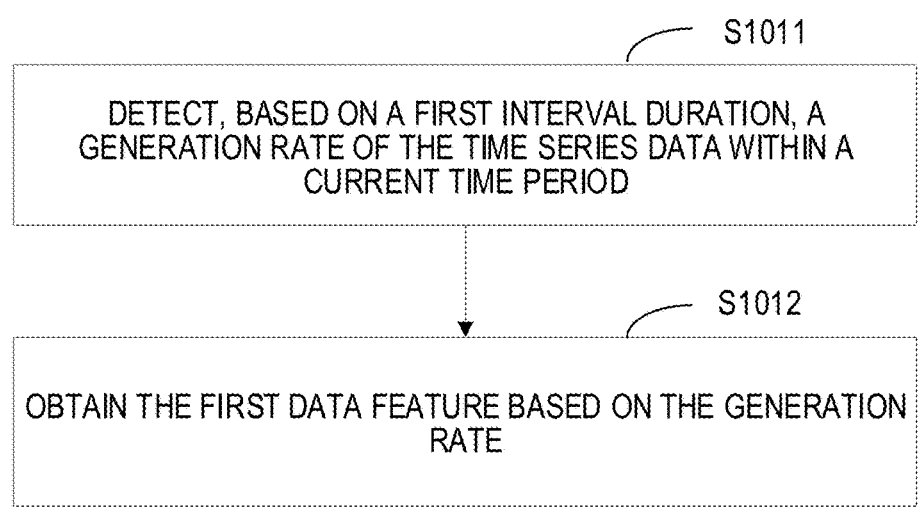
FIG. 3 is a schematic diagram of a data structure of a kind of target data according to an embodiment of the present disclosure.
FIG. 4 is a flowchart of a specific implementation of step S101 in the embodiment shown in FIG. 2.

By way of example, FIG. 3 is a schematic diagram of a data structure of a kind of target data according to an embodiment of the present disclosure. As shown in FIG. 3, the target data stores data information in the form of a data table, each row is a data record, and each column is a data dimension. Specifically, in a data table corresponding to the target data, a first column (data dimension A) corresponds to a data type of target data. For example, as shown in the figure, the data type of the target data is "cpu_load", which represents a CPU load; a second column (data dimension B) corresponds to a specific single index of target data, i.e., a device identification identifier, where idc represents a data center identifier and host represents a device identifier. A specific device may be identified by using a combination of the idc (data center identifier) and the host (device identifier). The third column (data dimension C) corresponds to another specific single index of target data, i.e., a time stamp, representing generation time of the data, for example, 20230419-000001, representing 00:00:01 on 19 Apr. 2013, and the other items are similar and will not be repeated. The fourth column (data dimension D) corresponds to the data type value of the target data, that is, the specific value of the CPU load. In another aspect, each row in the data to be processed represents a data record, and each data record includes information in the foregoing four dimensions (namely, the data record includes four dimensions).

In a possible implementation, the target data is time series data. As shown in FIG. 4, a specific implementation of step S101 includes:

Step S1011: detecting, based on a first interval duration, a generation rate of the time series data within a current time period.

Step S1012: obtaining the first data feature based on the generation rate.

By way of example, the data to be processed is time series data, the time series data is ordered data generated over time, and the server detects the amount of time series data generated in a current cycle with a fixed detection cycle (a first interval duration), so as to obtain a generation rate of the time series data in the current time period. Specifically, for example, after obtaining the time series data, the server calculates the time interval of each time series data record based on the time stamp information in the time series data. The longer the time interval is, the lower the generation rate is, and vice versa, i.e., the shorter the time interval is, the higher the generation rate is. In this way, the generating rate of the time series data is obtained. The first interval duration is the time interval for the server to read the time series data. Then, a fixed mapping is performed based on the generation rate, so that a corresponding first data feature may be obtained. In the step of this embodiment, the first data feature may be a discrete gear identifier, or may also be a continuous floating-point number, or may be set based on a specific manner of subsequent use for the first data feature, which will not be described herein for succinctness.

Step S102: determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly.

By way of example, the adaptive consistent hashing processing module is a predetermined software functional module. After the first data feature is obtained, the first data feature is processed by the adaptive consistent hashing processing module, and based on a data volume of target data represented by the first data feature, a corresponding target shard number is obtained, wherein shard number represents the number of storage units for storing data, i.e., the number of shards when the target data is stored in shards. Then, a mapping relationship between each data shard of the target data and a storage unit is established, which is the data shard information. The shards of target data are stored in different storage units, so as to implement load balancing between the storage units. The larger the data volume represented by the first data feature is, the larger the corresponding target shard number is, and vice versa, i.e., the smaller the data volume represented by the first data feature is, the smaller the corresponding target shard number is. A target shard number (the number of storage units) matched with the first data feature is obtained through the first data feature. When the data volume of the target data is relatively small, centralized storage on the same storage unit is implemented, thereby improving the efficiency of continuously reading data from a storage system. However, when the data volume of target data is large, distributed storage on a plurality of storage units is implemented, thereby the load of a single storage unit is reduced, and load balancing is achieved, and read/write efficiency of the storage system is improved. Then, the data shard information obtained based on the first data feature is synchronized to the configuration center, so as to save the data shard information adapted to the target data. A configuration center is used for recording data shard information, and regularly refreshing data shard information to a data write component. Subsequently, in response to an access request for the target data, the configuration center obtains the data shard information, and implements access and query of the target data based on the data shard information. The configuration center may be a service or an application program disposed inside or outside the server, and a specific implementation of the configuration center is configured according to requirements, which is not limited herein.

In a possible implementation, the first data feature and the target shard number have a many-to-one mapping relationship. For example, when the first data feature is located in a first feature interval (data interval), the target shard number is A, and when the first data feature is located in a second feature interval (data interval), the target shard number is B. Meanwhile, the target shard number has an upper limit value and a lower limit value. By way of example, the upper limit value of the target shard number is the number of available data storage units, and the lower limit value of the target shard number is 1.

In a possible implementation, the first data feature includes a dimension of a data record in the target data, and a specific implementation of obtaining the target shard number based on the first data feature is obtaining the target shard number based on the dimension of the data record. Specifically, the higher the dimension of the data record is, the larger target shard number is. For the meaning of the dimension of the data record, reference may be made to the description of the corresponding part of the data structure of the target data shown in FIG. 3. In this embodiment, the higher the dimension of the data record is, the larger the amount of data of a single data record is, the larger the overall data volume of the corresponding target data is. The corresponding target shard number is obtained based on the dimension of the data record, and the target data is stored in shards based on the target shard number, so that excessive data sets in the same storage unit may be avoided, which avoids occurrence of data hotspots and improves read-write performance of the storage system.

Figure 5:
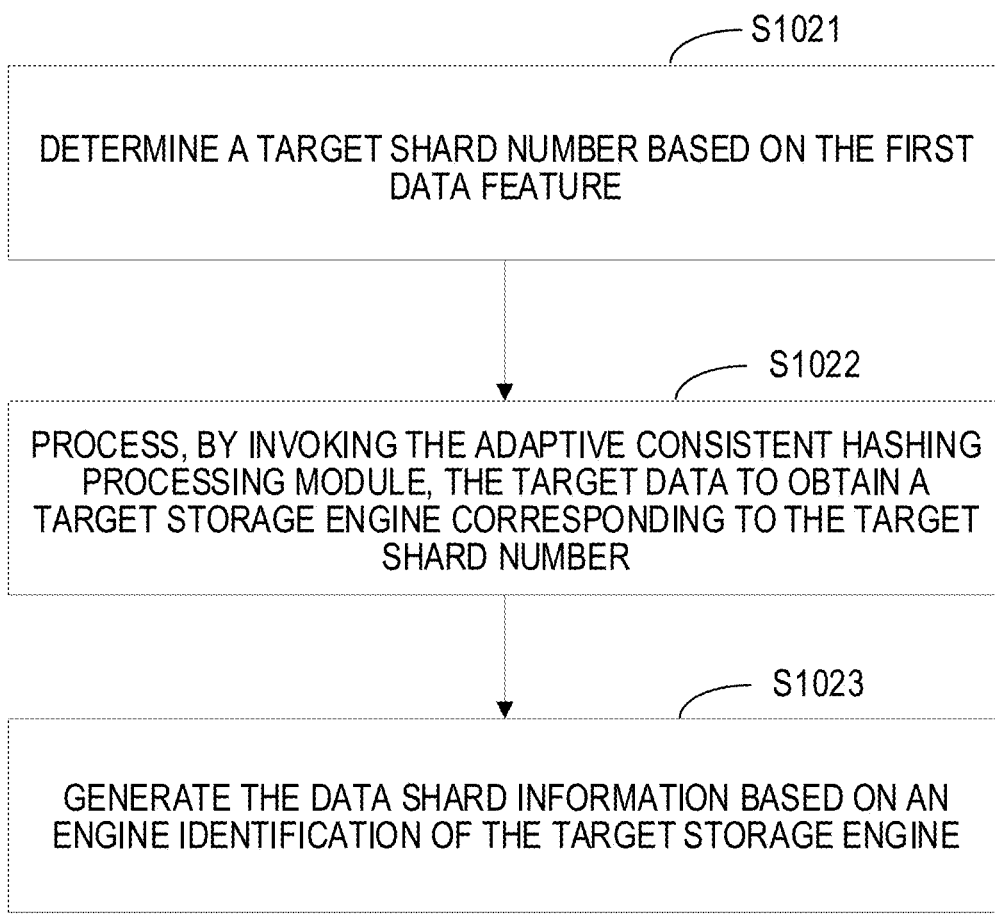
FIG. 5 is a flowchart of a specific implementation of step S102 in the embodiment shown in FIG. 2.

In a possible implementation, the adaptive consistent hashing processing module determines a mapping between sharded target data and a storage engine by using a consistent hashing algorithm, so as to generate data shard information matching the target data. By way of example, as shown in FIG. 5, a specific implementation of step S102 includes:

Step S1021: determining a target shard number based on the first data feature;

Step S1022: processing, by invoking the adaptive consistent hashing processing module, the target data to obtain a target storage engine corresponding to the target shard number;

Step S1023: generating the data shard information based on an engine identification of the target storage engine.

By way of example, there is a predetermined mapping relationship between the first data feature and the target shard number, and a specific implementation has been described in the foregoing embodiment, and is not repeatedly described here. After the target shard number is obtained, an adaptive consistent hashing module is invoked to process target data by means of a consistent hashing algorithm, so as to obtain a target storage engine(s) corresponding to target shard number. A consistent hashing algorithm is a method for mapping a binary value of any length to a binary value of a shorter fixed length, and the short binary value obtained after the hash operation is referred to as hash value. A hash value is a unique and compact numerical representation form of a piece of data. When data is stored in a distributed manner, a hash operation may be performed by using a certain piece of information or an index of the data as a hash input value, and a mapping with a storage unit is realized by using an obtained hash value. On this basis, in order to solve the problem of data mapping failure caused by a change (increase or decrease) of a storage unit, in an existing design, a consistent hashing algorithm is further provided. a circular hash space (namely, a hash ring) is set, and a hash identifier of the storage unit is set in the circular hash space to realize mapping between the data and the storage unit. Thereby, the problem of mapping failure between the data and the storage unit when the storage unit changes is avoided. The specific implementation and principle of the consistent hashing algorithm belong to the prior art, and are not described in detail herein.

On this basis, a consistent hashing operation between data and a storage unit needs to first obtain an input value in target data that is used for performing the hash operation, for example, a data ID and generation time of the target data. Since the target data includes data of one or more dimensions, it is necessary to obtain which data in the target data is used as an input value of the hash operation, that is, obtain the first target dimension of the target data. Then, data of target data that is in the first target dimension is acquired, a consistent hashing algorithm is invoked to perform a hash operation on the data in the first target dimension, and a modulo operation is performed based on a hash value obtained after the operation, so as to obtain a storage unit, i.e., a storage engine, corresponding to sharded target data.

Furthermore, there is a predetermined mapping relationship between target shard number and the first target data dimension of the target data, and based on the mapping relationship, the first target data dimension corresponding to the target shard number may be obtained. Specifically, the mapping relationship includes: in response to the target shard number being equal to 1, the first target data dimension is a first dimension, and data in the first dimension represents a data category of the target data; and in response to the target shard number being greater than 1, the first target data dimension is the first dimension and at least one second dimension, and data in the second dimension represents a single index of the target data. In this step of this embodiment, when the target shard number obtained based on the first data feature is equal to 1, it indicates that the data volume of the target data is small, and it is possible to directly store into a corresponding storage engine based on a data category (a first dimension) of target data, so as to ensure that data of the same data category (for example, a running temperature of a CPU and a device load) may be stored in the same storage unit, thereby improving the data acquisition efficiency when such data is subsequently read and processed, and reducing the acquisition cost. When the target shard number obtained based on the first data feature is greater than 1, it indicates that the data volume of the target data is large. In this case, the target data needs to be further stored in shards based on the data category and at least one other index, and mapped to a corresponding storage engine based on data in the first dimension and the second dimension being used hash input values. Thereby, it realizes data allocation based on a single index (a second dimension), for example, sharded based on a device identification identifier, sharded based on a storage cluster identifier, etc., In this way, load balancing between the storage units is achieved, and read/write efficiency of the storage system is improved.

Figure 6:
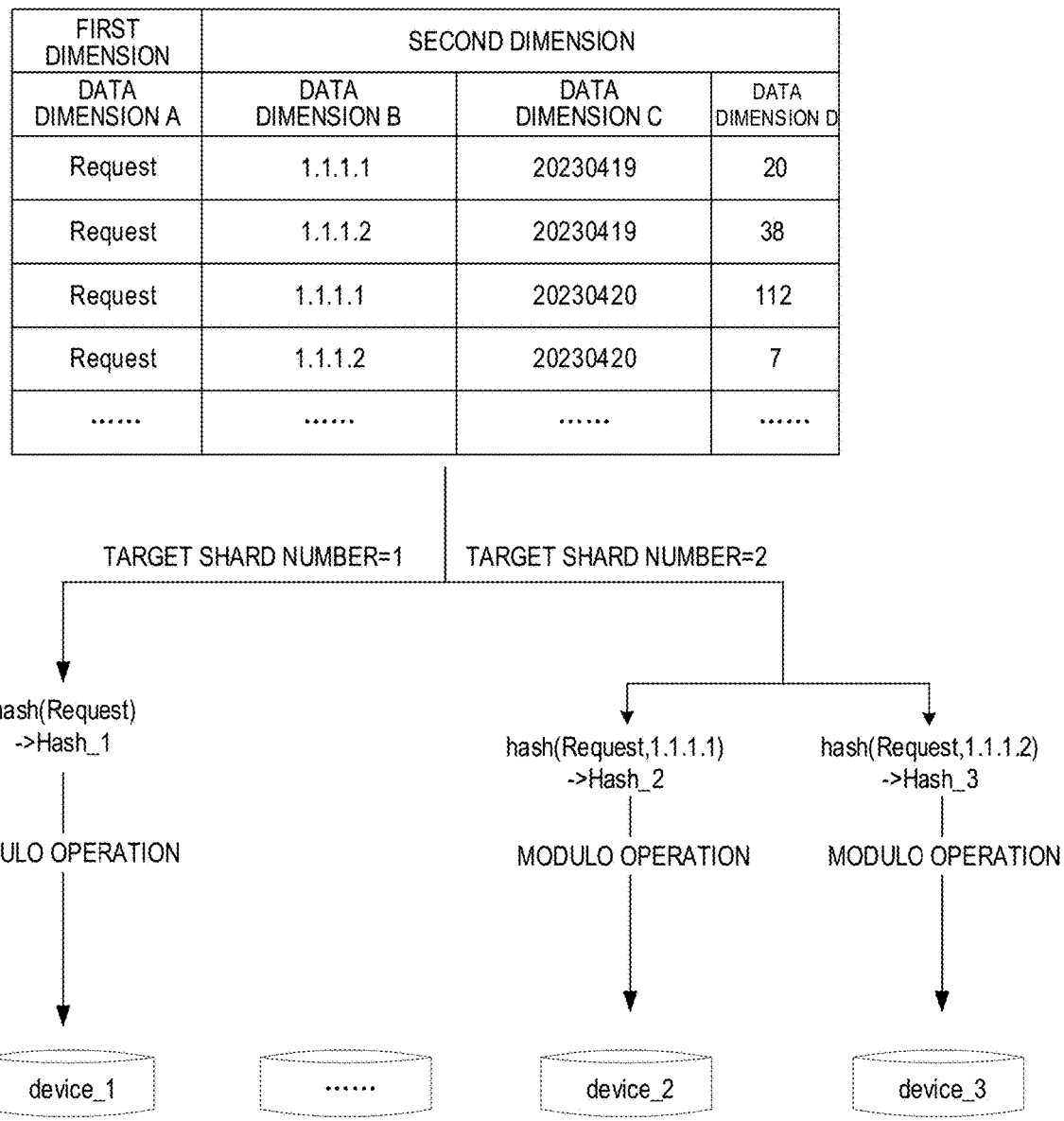
FIG. 6 is a schematic diagram of a process for determining a target storage engine according to an embodiment of the present disclosure.

FIG. 6 is a schematic diagram of a process for determining a target storage engine according to an embodiment of the present disclosure. As shown in FIG. 6, the target data includes a data dimension A, a data dimension B, a data dimension C, and a data dimension D. Data in the data dimension A represents a data type of the target data, for example, an access request (denoted as Request in the figure). Data in the data dimension B represents an IP address of the device, for example, 1.1.1.1 and 1.1.1.2. Data in the data dimension C represents a data generation time, for example, 20230419 (representing 19 Apr. 2013, which is also not repeated here) and 20230420. Data in the data dimension D represents the number of times of access, comprising 20, 38, 112 and 7. The data dimension A is the first dimension, and the data dimension B, the data dimension C, and the data dimension D are the second dimension. Referring to this figure, when the corresponding target segment number obtained for the first data feature is 1 (denoted as target shard number=1 in the figure), a hash operation is performed on data in a data dimension A ("Request"), that is, hash (Request) is calculated to obtain a corresponding hash value Hash_1, and then a modulo operation is performed on Hash_1 based on a predetermined value, and an obtained modulo result is mapped to a corresponding storage engine, which is device_1. That is, the target data is entirely stored in device_1. When the corresponding target segment number obtained for the first data feature is larger than 1 (denoted as target shard number=2 in the figure), in a possible implementation, a hash operation is performed by using a combination of data in the data dimension B ("1.1.1.1" or "1.1.1.2") and data in the data dimension A ("Request"), that is, hash (Request,1.1.1.1) and hash(Request,1.1.1.2) are calculated, so as to obtain the corresponding hash values Hash_2 and Hash_3, respectively. Then, modulo operations are performed on Hash_2 and Hash_3, respectively, and mapped to the corresponding storage engines device_2 and device_3. Certainly, in another possible implementation, combination may also be performed with the data dimension A based on the data dimension C, and a hash operation is performed to obtain a corresponding storage engine. Specific implementations are similar, and are not described here again.

Figure 7:
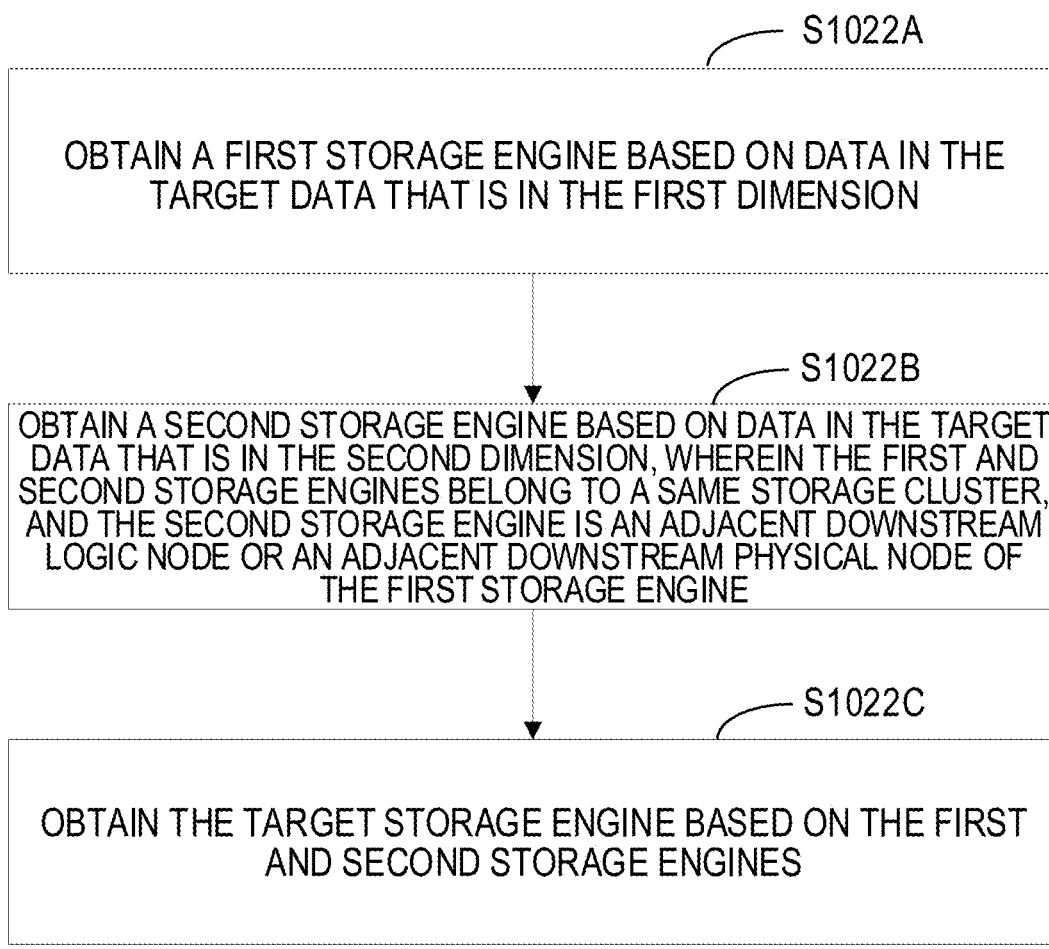
FIG. 7 is a flowchart of a specific implementation of step S1022 in the embodiment shown in FIG. 5.

Furthermore, in a possible implementation, when the first target data dimension is the first dimension and the at least one second dimension, that is, the target shard number is greater than 1, as shown in FIG. 7, a specific implementation of step S1022 includes:

Step S1022A: obtaining a first storage engine based on data in the target data that is in the first dimension.

Step S1022B: obtaining a second storage engine based on data in the target data that is in the second dimension, wherein the first and second storage engines belong to a same storage cluster, and the second storage engine is an adjacent downstream logic node or an adjacent downstream physical node of the first storage engine.

Step S1022C: obtaining the target storage engine based on the first and second storage engines.

By way of example, in combination with the method for obtaining a corresponding storage engine by performing a hash operation on data in different dimensions in target data introduced in the foregoing step, a first storage engine may be obtained based on the data in the first dimension at first. The first storage engine is a storage device used for storing data of a data type of the target data, for example, a storage device used for storing CPU temperature data. Then, on this basis, based on the data in the second dimension in the target data, several downstream nodes following the first storage engine are obtained as second storage engines, and the first storage engine and the second storage engines are taken as storage engines. In the steps of this embodiment, a first storage engine is determined based on data in a first dimension, and then a second storage engine(s) downstream adjacent to the first storage engine is determined based on data in a second dimension. Thereby, target data belonging to the same data category may be stored in the same storage cluster, and the data transmission time consumption during subsequent reading and processing of such data is reduced, which improves the read-write performance of the storage system.

Step S103: writing, by invoking the data write component, the target data into a corresponding storage engine based on the data shard information, wherein the storage engine supports query processing of the target data.

By way of example, the data writing component is also a predetermined software functional module. Furthermore, after obtaining the data shard information, the server invokes the data write component to store the target data in a corresponding storage engine. A mapping relationship between the sharded target data and the storage engine is determined based on the data shard information. The data shard information is sent to the data write component by the configuration center, and therefore, the sharding storage process of the target data may be completed based on the data shard information, by invoking the data write component.

In this embodiment, reading, from a message queue, target data to be stored in a current cycle, and extracting a first data feature of the target data, the first data feature representing a data volume of the target data; determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and writing, by invoking the data write component, the target data into a corresponding storage engine based on the data shard information, wherein the storage engine supports query processing of the target data. A first data feature of target data is extracted, the data shard information is obtained based on the first data feature, and a process of storing the target data in shards is performed based on the data shard information. Thereby, an effect of dynamically allocating storage units based on the data volume of the target data is achieved, the problem of a large-volume data set being stored in a single storage unit or a small number of storage units is avoided, thereby avoiding the problem of data hotspots or the like, and thus the overall throughput and read/write performance of the storage system can be improved.

Figure 8:
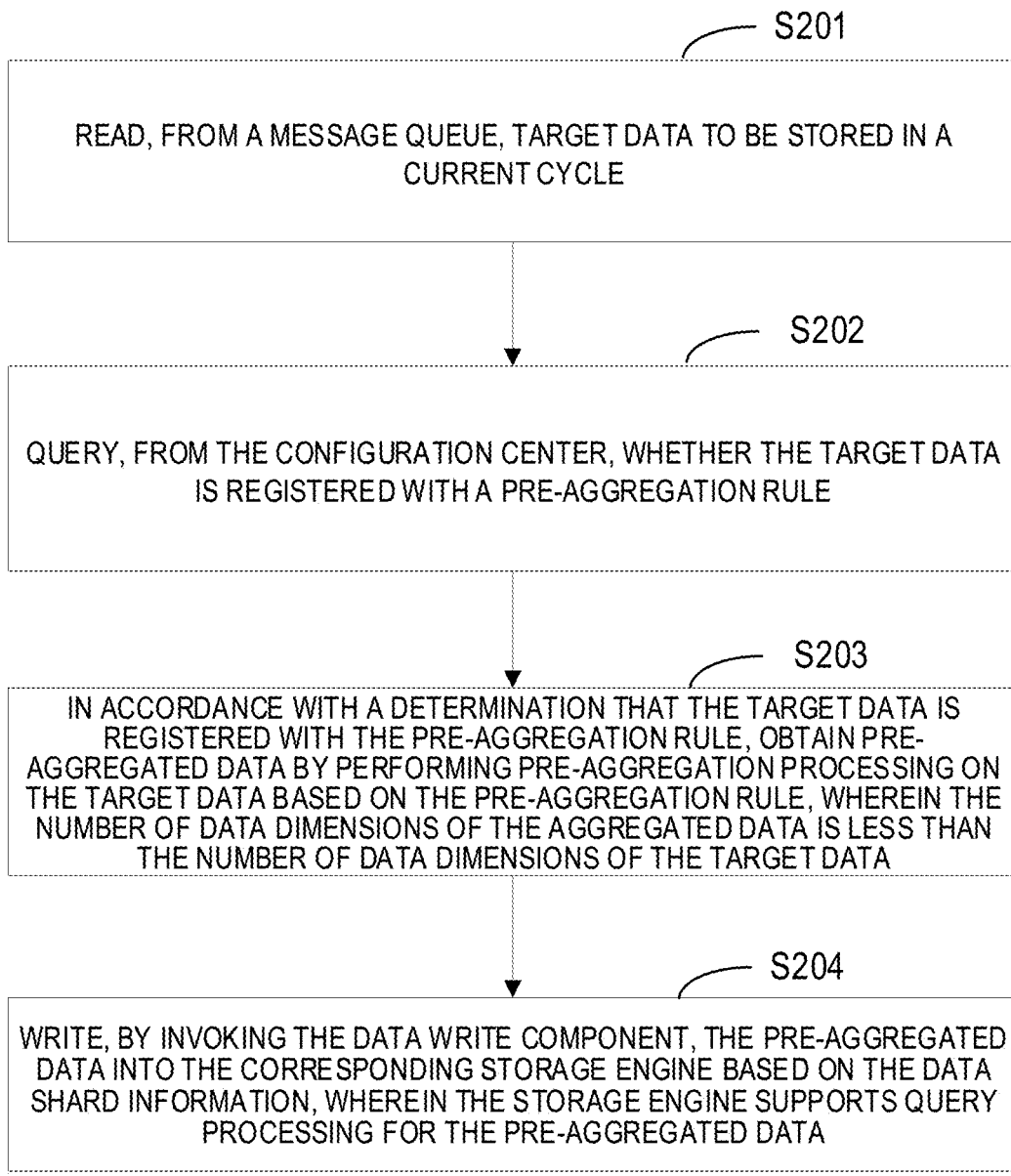
FIG. 8 is a second schematic flowchart of a method for storing data according to an embodiment of the present disclosure.

Referring to FIG. 8, FIG. 8 is a second schematic flowchart of a method for storing data according to an embodiment of the present disclosure. In this embodiment, the step S103 is further refined based on the embodiment shown in FIG. 2, and a step of pre-aggregating data to be processed is added. The method of this embodiment comprises:

Step S201: reading, from a message queue, target data to be stored in a current cycle.

Step S202: querying, from the configuration center, whether the target data is registered with a pre-aggregation rule.

By way of example, before performing the pre-aggregation operation, the server may generate a pre-aggregation rule in the configuration center through a predetermined configuration instruction. Then, based on the pre-aggregation rule, a corresponding second target data dimension is determined, and data dimension reduction is performed by taking the second target data dimension as a target, so as to obtain aggregated data. The pre-aggregation rule represents a mapping relationship between a first dimension of target data and a second target data dimension of the target data. The pre-aggregation rule describes an aggregation mode of target data of at least one data type when performing pre-aggregation. By means of generating a corresponding pre-aggregation rule based on a configuration instruction, the flexible aggregation of target data can be realized, which satisfies the personalized storage and reading requirements of a user, and improves the read-write performance of a storage system.

Step S203: in accordance with a determination that the target data is registered with the pre-aggregation rule, obtaining pre-aggregated data by performing pre-aggregation processing on the target data based on the pre-aggregation rule, wherein the number of data dimensions of the aggregated data is less than the number of data dimensions of the target data.

Figure 9:
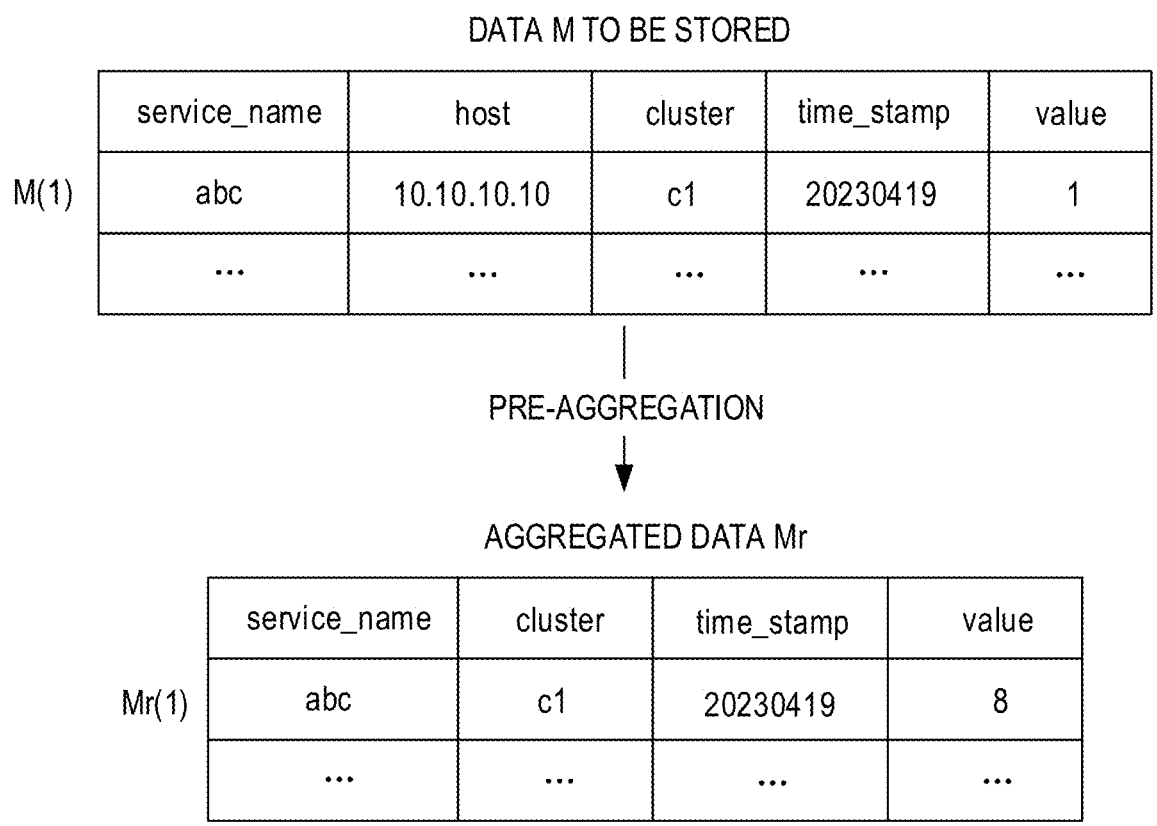
FIG. 9 is a schematic diagram of a pre-aggregation process according to an embodiment of the present disclosure.

By way of example, after the target data is obtained, the target data may be pre-aggregated at first, thereby implementing dimension reduction on the target data and reducing the data volume, so as to improve efficiency of subsequent storage and read of the data. Specifically, the pre-aggregation rule is used to represent a mapping relationship between the first dimension of the target data and the second target data dimension of the target data. Pre-aggregating the second target data dimension of the target data refers to combining data of one or more data dimensions in the target data, thereby the data dimension reduction is achieved. FIG. 9 is a schematic diagram of a pre-aggregation process according to an embodiment of the present disclosure. As shown in FIG. 9, by way of example, the target data M is time series data, which includes five data dimensions (all of which belong to the second dimension), i.e., service_name, host, cluster, time_stamp and value, which represent a service name (service_name), a device address (host), a cluster identifier (cluster), a data timestamp (time_stamp) and a data value (value), respectively. Based on a pre-aggregation rule configured in advance, the service_name, cluster, and time_stamp are taken as the second target data dimension, and aggregation is performed in an aggregation manner of accumulated summation, so as to delete data in the dimension host. More specifically, for a data record M(1) in the target data M, the corresponding data content is: service_name=abc, host=10.10.10.10, cluster=c1, time_stamp=20230419, value=1, and after the second target data dimension of the target data is pre-aggregated, the data in the host dimension will be discarded, and an accumulated summation operation is performed on data points that have the same service_name dimension, dc dimension and time_stamp dimension, to obtain the aggregated data Mr. Data corresponding to the data record M(1) is the aggregated data record Mr(1), and the corresponding data content is: service_name=abc, cluster=c1, time_stamp=20230419, value=8, which means that for a service whose service name is abc, the sum of data values of all devices corresponding to the cluster identifier c1 on Apr. 19, 2023 is 8.

In the foregoing embodiment, the second target data dimension refers to a data dimension reserved in the target data. In another possible implementation, the second target data dimension may also refer to a data dimension deleted from the target data, and subsequent execution manners may be correspondingly adjusted, which are not described here again.

By way of example, the target data is time series data, and a specific implementation of step S203 includes:

Step S2031: acquiring data generation timestamps corresponding to the time series data.

Step S2032: performing, based on the data generation timestamps and the pre-aggregation rule, the pre-aggregation processing on the target data to obtain the pre-aggregated data, wherein the pre-aggregation rule is a rule for aggregating time series data based on a time dimension.

By way of example, when the target data is time series data, the generation of the target data has a time-domain feature. For example, the generation time corresponding to each piece of recorded data in the target data has a specific feature, and this feature may be represented by a data generation time stamp. On this basis, pre-aggregation processing is performed on the data based on data generation time stamps and a pre-aggregation rule representing a rule for aggregating time series data based on a time dimension, thereby data aggregation based on the time dimension may be achieved. Specifically, for example, recorded data generated between time point A and time point B in time domain data is aggregated, thereby statistics on a characteristic time period(s) are realized. The pre-aggregation rule specific to the time series data can reduce the amount of data effectively, while achieving aggregation statistics of a time dimension (a plurality of time periods), and thus the data quality and content richness of generated pre-aggregated data can be improved.

Step S204: writing, by invoking the data write component, the pre-aggregated data into the corresponding storage engine based on the data shard information, wherein the storage engine supports query processing for the pre-aggregated data.

Figure 10:
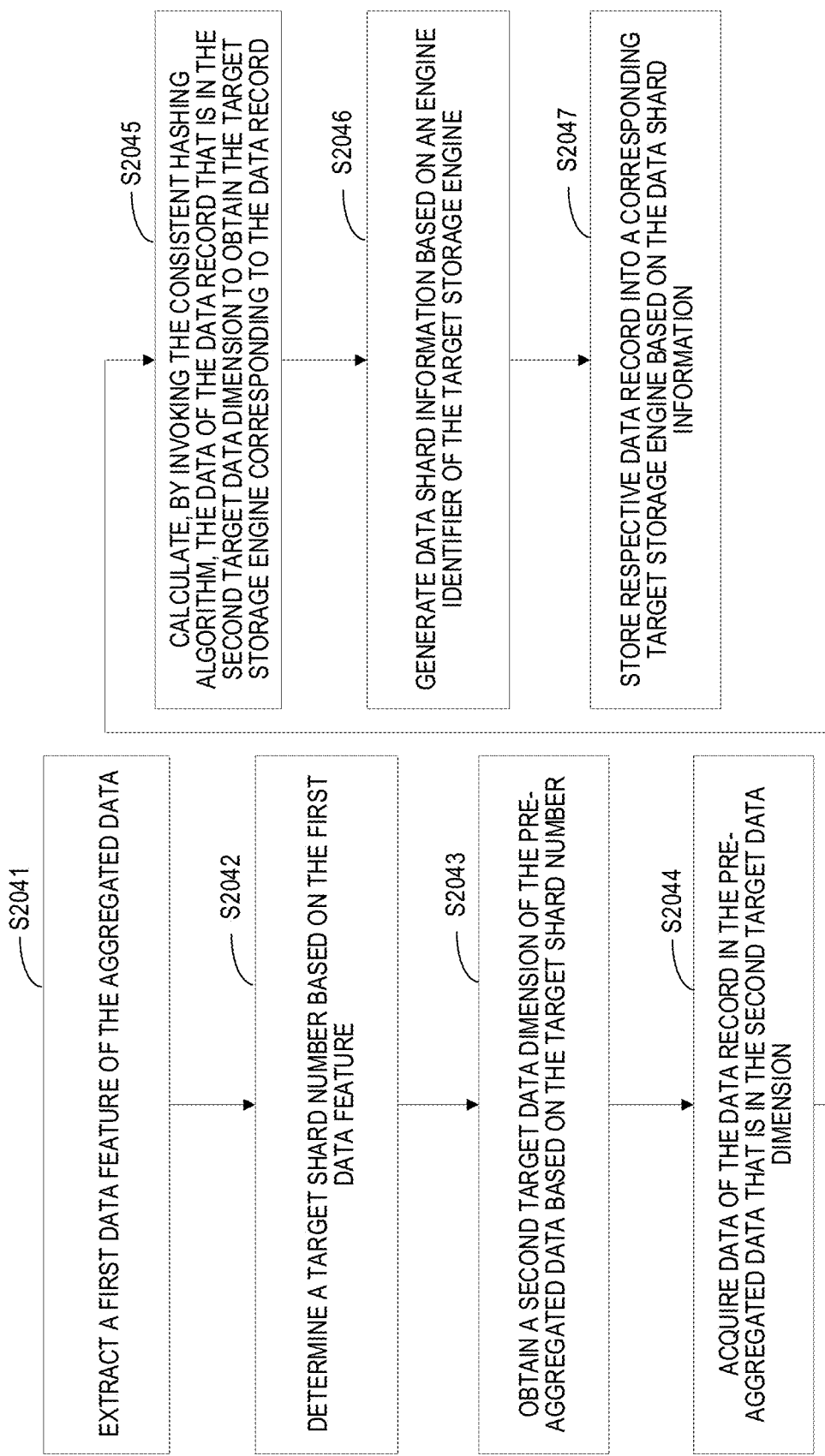
FIG. 10 is a flowchart of a specific implementation of step S204 in the embodiment shown in FIG. 8.

By way of example, as shown in FIG. 10, specific implementation steps of step S204 include:

Step S2041: extracting a first data feature of the aggregated data.

Step S2042: determining a target shard number based on the first data feature.

By way of example, a specific implementation of extracting the first data feature based on the aggregation data and obtaining the target shard number based on the first data feature in steps S203 to S204 are the same as the implementation of implementing corresponding steps based on the pre-aggregated data in the embodiment shown in FIG. 2. Reference may be made to the relevant description of the corresponding parts in the embodiment shown in FIG. 2, and details are not repeated here.

Step S2043: obtaining a second target data dimension of the pre-aggregated data based on the target shard number.

By way of example, after the target shard number is obtained, based on the specific target shard number, it is determined that the second target data dimension is the first dimension, or the first dimension and the at least one second dimension. Specific implementations have been described in detail in the embodiment shown in FIG. 2, and are not described here again. In the subsequent steps, a case where the target shard number is greater than 1 (i.e., the second target data dimension is the first dimension and the at least one second dimension) is further described.

Step S2044: acquiring data of the data record in the pre-aggregated data that is in the second target data dimension.

Step S2045: calculating, by invoking the consistent hashing algorithm, the data of the data record that is in the second target data dimension to obtain the target storage engine corresponding to the data record.

Furthermore, the pre-aggregated data includes at least one data record. When the second target data dimension is the first dimension and the at least one second dimension, data of the data record in the pre-aggregation data that is in the first dimension and the at least one second dimension is acquired. Then, a consistent hashing algorithm is invoked to calculate data of the data record that is in the first dimension and the at least one second dimension, so as to obtain a target storage engine corresponding to the data record.

By way of example, a specific implementation of step S2045 includes:

Step S2045A: acquiring first data of the data record in a first dimension, and calculating the first data based on a target hashing algorithm to obtain a first hash value.

Step S2045B: acquiring second data of the data record in at least one second dimension, and calculating the second data in the at least one second dimension based on the target hashing algorithm to obtain a second hash value.

Step S2045C: performing a modulo operation on a predetermined hash ring length by using the first hash value and the second hash value, respectively, to obtain a first hash ring location corresponding to the first hash value and a second hash ring location corresponding to the second hash value.

Step S2045D: obtaining a target storage engine corresponding to the data record based on a sum of the first and second hash ring locations.

Figure 11:
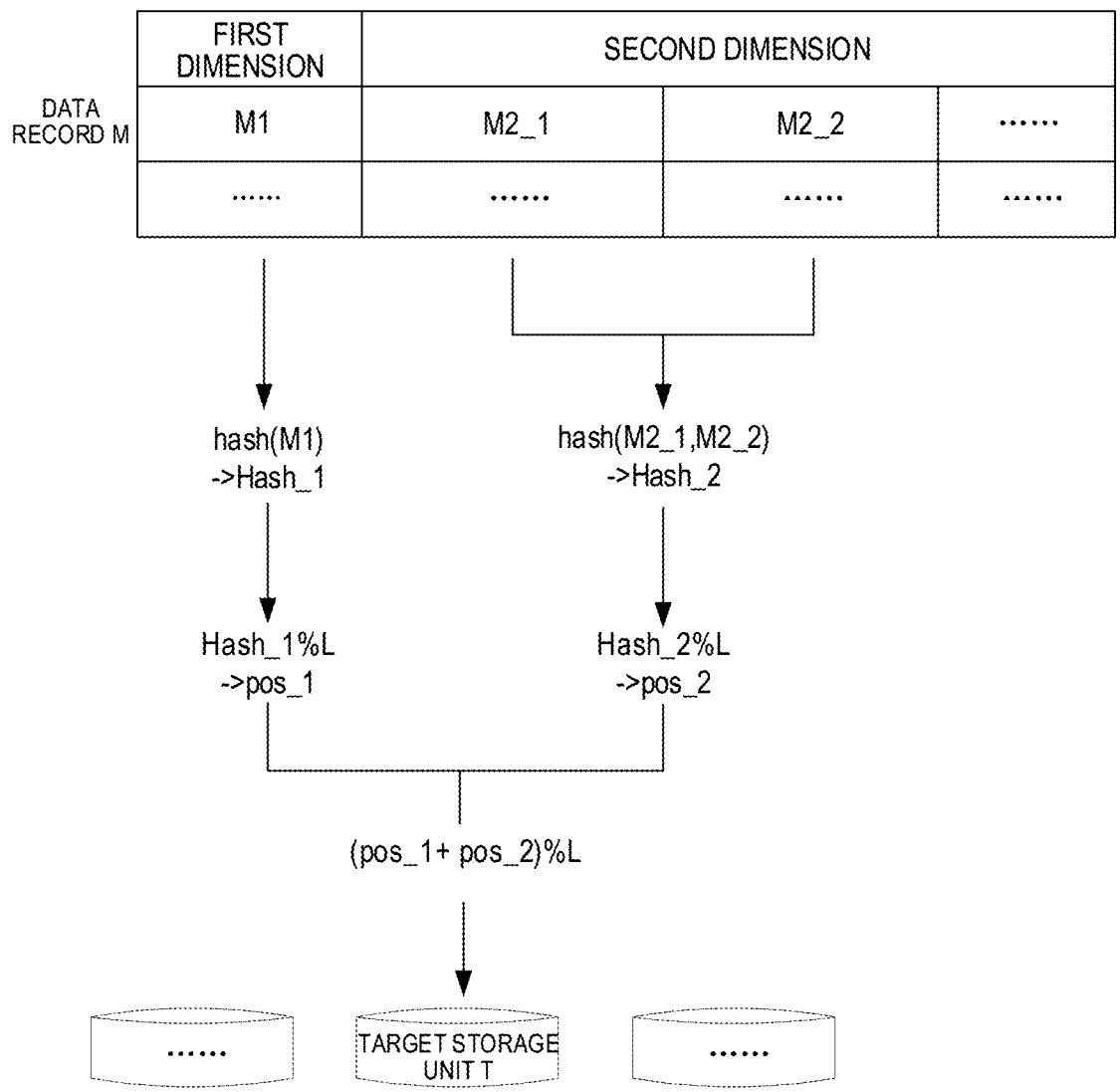
FIG. 11 is a schematic diagram of a process of determining a storage engine according to an embodiment of the present disclosure.

FIG. 11 is a schematic diagram of a process of determining a storage engine according to an embodiment of the present disclosure. The foregoing steps are described in detail with reference to FIG. 11. By way of example, as shown in FIG. 11, for a data record M in pre-aggregated data, first data M1 (shown as M1 in the figure) of the data record M in a first dimension is obtained at first. The first dimension represents a data type of the data record M, for example, CPU temperature data. Then, a hash operation is performed on the first data M1 based on the target hashing algorithm (denoted as hash (M1) in the figure) to obtain a first hash value (denoted as Hash_1 in the figure). Afterwards, by means of steps similar to the described steps, second data of the data record M1 that is in at least one second dimension, i.e., second data M2_1 and second data M2_2 (denoted as M2_1 and M2_2 in the figure, respectively) are obtained, and a hash operation is performed on a combination of the second data M2_1 and the second data M2_2 by using the same target hashing algorithm (denoted as hash (M2_1, M2_2) in the figure), so as to obtain a second hash value (denoted as Hash_2 in the figure). Then, a modulo operation is performed on a predetermined hash ring length (denoted as L in the figure) by using the first hash value and the second hash value respectively (denoted as Hash_1% L and Hash_2% L in the figure), so as to obtain the remainder of the first hash value and the second hash value relative to the hash ring length, that is, the first hash ring position (denoted as pos_1 in the figure) corresponding to the first hash value and the second hash ring position (denoted as pos_2 in the figure) corresponding to the second hash value. Afterwards, a sum of the first hash ring position and the second hash ring position is calculated, and a modulo operation is performed on the length of the hash ring (denoted as (pos_1+pos_2)% L in the figure), in order to obtain a storage engine T corresponding to the data record.

Step S2046: generating data shard information based on an engine identification of the target storage engine.

Step S2047: storing respective data record into a corresponding target storage engine based on the data shard information.

Furthermore, after a storage engine corresponding to respective data record in the pre-aggregated data is determined, each data record is stored into the corresponding storage engine respectively, thereby achieving the purpose of sharding storage based on the data feature of respective data record in the pre-aggregated data. In this embodiment, a consistent hashing operation is performed on data in a first dimension and data in a second dimension, respectively, and the hash values obtained by calculation are superpositioned to form a two-level hash ring (a first level hash ring corresponding to the first dimension and a second hash ring corresponding to the second dimension). In this way, sharding based on a single index of data is achieved, so that pre-aggregated data can be evenly distributed to a plurality of corresponding storage units, and thus the uniformity of mapping of data shards on a hash ring (a corresponding storage unit) is improved.

It should be noted that, the above-mentioned processing based on the pre-aggregated data implements the process of writing the pre-aggregated data into the corresponding storage engine based on the data shard information, and this is also applicable to processing based on target data (data that is not pre-aggregated), so as to implement a process of writing target data into a corresponding storage engine based on data shard information. That is, based on the embodiment shown in FIG. 2, the process of writing the target data into the target storage engine is further refined, and details are not described here again.

Optionally, in a possible implementation, after step S204, the method further includes:

Step S2051: receiving a first query instruction for the pre-aggregated data.

Step S2052: acquiring, based on the first query instruction, the pre-aggregation rule corresponding to the pre-aggregation data from the configuration center.

Step S2053: acquiring the pre-aggregation data from the search engine based on the pre-aggregation rule corresponding to the pre-aggregation data.

By way of example, after the pre-aggregated data (and/or the target data) is written into the storage engine, a query for the pre-aggregated data (and/or the target data) may be further implemented based on a first query instruction, and this process may be implemented based on a data query component. Specifically, after a first query instruction for pre-aggregated data is received, a pre-aggregation rule corresponding to the pre-aggregated data is acquired by the configuration center. Then, target data corresponding to the first query instruction is acquired based on data shard information, and the target data is subjected to aggregation processing based on the pre-aggregation rule, so as to obtain the pre-aggregated data.

Optionally, in another possible implementation, after step S204, the method further includes:

Step S2054: receiving a second query instruction for the pre-aggregated data.

Step S2055: querying, by invoking the adaptive consistent hashing processing module, the configuration center to obtain the data shard information of the pre-aggregated data.

Step S2056: performing, by invoking a data query component, a data query based on the data shard information of the target data to obtain the pre-aggregated data.

By way of example, in another possible implementation, the pre-aggregated data corresponds to data shard information. After the pre-aggregated data is written into a plurality of storage engines, a query for the pre-aggregated data may be further implemented based on a second query instruction, and the process may be implemented based on a data query component. Specifically, after a second query instruction for pre-aggregated data is received, data shard information corresponding to the pre-aggregated data is acquired by the configuration center, so as to obtain the pre-aggregated data. It should be noted that, the steps in this embodiment are also applicable to a query for target data, which is not described here again.

Figure 12:
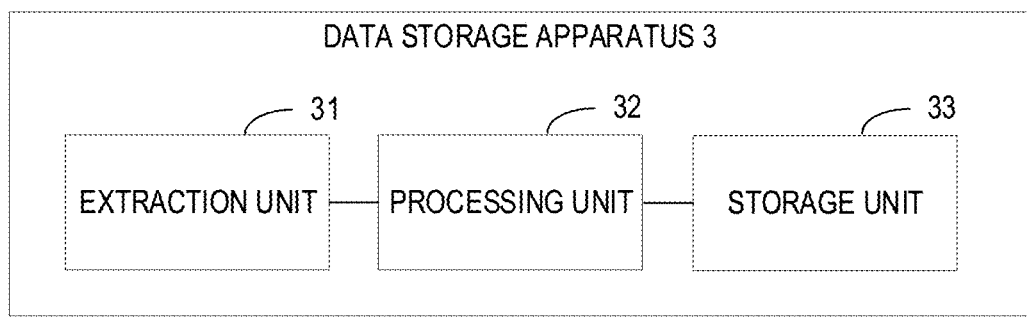
FIG. 12 is a structural block diagram of a data storage apparatus according to an embodiment of the present disclosure.

Corresponding to the method for storing data in the foregoing embodiment, FIG. 12 is a structural block diagram of a data storage apparatus according to an embodiment of the present disclosure. For ease of illustration, only parts related to the embodiments of the present disclosure are shown.

Referring to FIG. 12, the data storage apparatus 3 includes:

- an extraction unit 31 configured for reading, from a message queue, target data to be stored in a current cycle, and extracting a first data feature of the target data, the first data feature representing a data volume of the target data;
- a processing unit 32 configured for determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and
- a storage unit 33 configured for writing, by invoking the data write component, the target data into a corresponding storage engine based on the data shard information, wherein the storage engine supports query processing of the target data.

In one embodiment of the present disclosure, the storage unit 33 is further configured for: querying, from the configuration center, whether the target data is registered with a pre-aggregation rule; in accordance with a determination that the target data is registered with the pre-aggregation rule, obtaining pre-aggregated data by performing pre-aggregation processing on the target data based on the pre-aggregation rule, wherein the number of data dimensions of the aggregated data is less than the number of data dimensions of the target data; and writing, by invoking the data write component, the pre-aggregated data into the corresponding storage engine based on the data shard information, wherein the storage engine supports query processing for the pre-aggregated data.

In one embodiment of the present disclosure, the target data is time series data, and when obtaining the pre-aggregated data by performing pre-aggregation processing on the target data based on the pre-aggregation rule, the storage unit 33 is specifically configured for: acquiring data generation timestamps corresponding to the time series data; and performing, based on the data generation timestamps and the pre-aggregation rule, the pre-aggregation processing on the target data to obtain the pre-aggregated data, wherein the pre-aggregation rule is a rule for aggregating time series data based on a time dimension.

In one embodiment of the present disclosure, the storage unit 33 is further configured for: receiving a first query instruction for the pre-aggregated data; acquiring, based on the first query instruction, the pre-aggregation rule corresponding to the pre-aggregation data from the configuration center; and acquiring the pre-aggregation data from the search engine based on the pre-aggregation rule corresponding to the pre-aggregation data.

In one embodiment of the present disclosure, the storage unit 33 is further configured for: receiving a second query instruction for the target data; querying, by invoking the adaptive consistent hashing processing module, the configuration center to obtain the data shard information of the target data; and performing, by invoking a data query component, a data query based on the data shard information of the target data to obtain the target data.

In an embodiment of the present disclosure, the processing unit 32 is specifically configured for: determining a target shard number based on the first data feature; processing, by invoking the adaptive consistent hashing processing module, the target data to obtain a target storage engine corresponding to the target shard number; and generating the data shard information based on an engine identification of the target storage engine.

In an embodiment of the present disclosure, when processing, by invoking the adaptive consistent hashing processing module, the target data to obtain the target storage engine corresponding to the target shard number, the processing unit 32 is specifically configured for: obtaining a first target data dimension of the target data based on target shard number; and processing, based on a consistent hashing algorithm, data in the target data that is in the first target data dimension to obtain the target storage engine.

In an embodiment of the present disclosure, when obtaining the first target data dimension of the target data based on target shard number, the processing unit 32 is specifically configured for: in response to the target shard number being equal to 1, determining that the first target data dimension is a first dimension, and data in the first dimension represents a data category of the target data; and in response to the target shard number being greater than 1, determining that the first target data dimension is the first dimension and at least one second dimension, and data in the second dimension represents a single index of the target data.

In an embodiment of the present disclosure, in response to the first target data dimension being the first dimension and the at least one second dimension, when processing, based on the consistent hashing algorithm, the data in the target data that is in the first target data dimension to obtain the target storage engine, the processing unit 32 is specifically configured for: obtaining a first storage engine based on data in the target data that is in the first dimension; obtaining a second storage engine based on data in the target data that is in the second dimension, wherein the first and second storage engines belong to a same storage cluster, and the second storage engine is an adjacent downstream logic node or an adjacent downstream physical node of the first storage engine; and obtaining the target storage engine based on the first and second storage engines.

In an embodiment of the present disclosure, the target data comprises at least one data record, and when processing, based on a consistent hashing algorithm, the data in the target data that is in the first target data dimension to obtain the target storage engine, the processing unit 32 is specifically configured for: acquiring data of the data record in the target data that is in the first target data dimension; and calculating, by invoking the consistent hashing algorithm, the data of the data record that is in the first target data dimension to obtain the target storage engine corresponding to the data record.

In an embodiment of the present disclosure, when calculating, by invoking the consistent hashing algorithm, the data of the data record that is in the first target data dimension to obtain the target storage engine corresponding to the data record, the processing unit 32 is specifically configured for: acquiring first data of the data record in a first dimension, and calculating the first data based on a target hashing algorithm to obtain a first hash value; acquiring second data of the data record in at least one second dimension, and calculating the second data in the at least one second dimension based on the target hashing algorithm to obtain a second hash value; performing a modulo operation on a predetermined hash ring length by using the first hash value and the second hash value, respectively, to obtain a first hash ring location corresponding to the first hash value and a second hash ring location corresponding to the second hash value; and obtaining a target storage engine corresponding to the data record based on a sum of the first and second hash ring locations.

In one embodiment of the present disclosure, the first data feature comprises a dimension of a data record in the target data.

In an embodiment of the present disclosure, the target data is time series data, and when extracting the first data feature of the target data, the extracting unit 31 is specifically configured for: detecting, based on a first interval duration, a generation rate of the time series data within a current time period; and obtaining the first data feature based on the generation rate.

The extraction unit 31, the processing unit 32, and the storage unit 33 are connected in sequence. The data storage apparatus 3 provided in this embodiment may execute the technical solutions of the foregoing embodiments of the method. The implementation principles and technical effects of the data storage apparatus 3 are similar to those of the foregoing embodiments of the method, and are not further described here.

Figure 13:
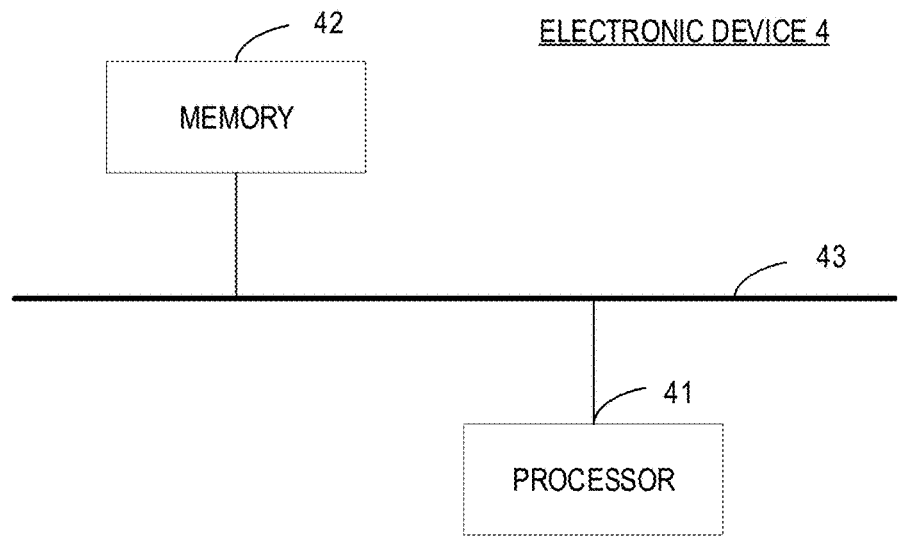
FIG. 13 is a schematic structural diagram of an electronic device according to an embodiment of the present disclosure.

FIG. 13 is a schematic structural diagram of an electronic device according to an embodiment of the present disclosure. As shown in FIG. 13, the electronic device 4 includes:
  a processor 41, and a memory 42 communicatively connected to the processor 41;
  the memory 42 stores computer executable instructions;
  the processor 41 executes the computer executable instructions stored in the memory 42 to implement a method for storing data in accordance with the embodiments shown in FIGS. 2-11.

Optionally, the processor 41 and the memory 42 are connected by using a bus 43.

The related descriptions may be understood with reference to the related descriptions and effects corresponding to the steps in the embodiments corresponding to FIGS. 2-11, and are not repeated here.

Embodiments of the present disclosure provide a computer readable storage medium with computer executable instructions stored thereon, wherein the computer executable instructions, when being executed by a processor, implement a method for storing data provided by any of the embodiments corresponding to FIGS. 2-11 of the present disclosure.

Embodiments of the present disclosure provide a computer program product comprising a computer program, wherein the computer program, when being executed by a processor, implements a method for storing data in accordance with embodiments shown in FIGS. 2-11.

Figure 14:
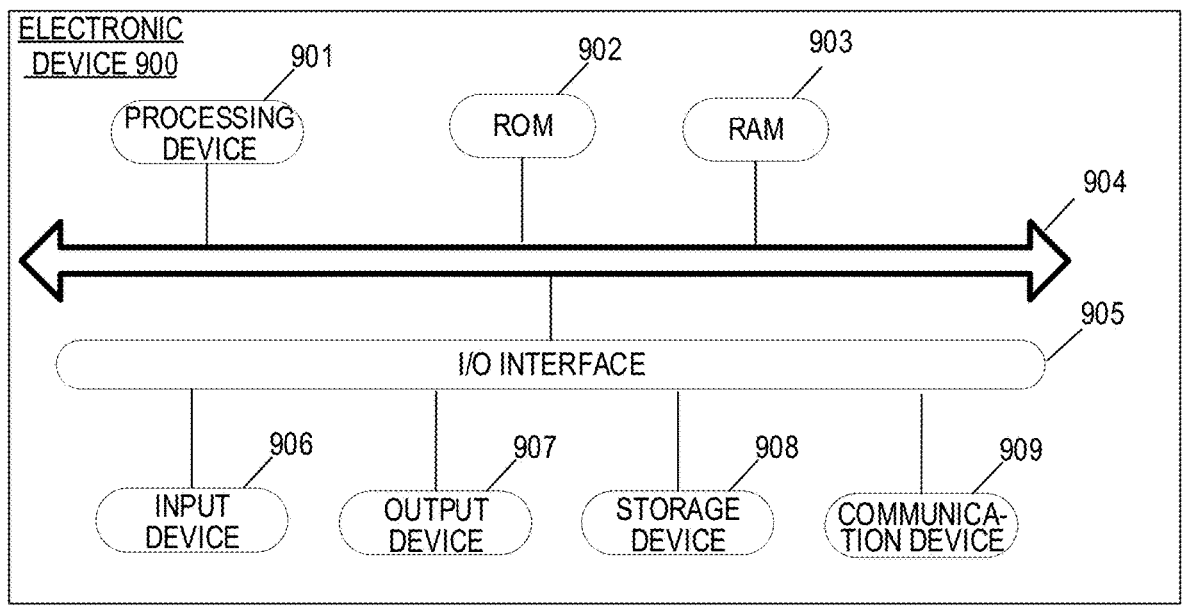
FIG. 14 is a schematic diagram of a hardware structure of an electronic device according to an embodiment of the present disclosure.

Referring to FIG. 14, it illustrates a structural schematic diagram of an electronic device 900 suitable for implementing an embodiment of the present disclosure. The electronic device 900 may be a terminal device or a server. The terminal device may include, but is not limited to, a mobile terminal such as a mobile phone, a laptop computer, a digital broadcast receiver, a personal digital assistant (PDA for short), a portable android device (PAD for short), a portable media player (PMP for short), a vehicle-mounted terminal (for example, a vehicle-mounted navigation terminal), and the like, and a fixed terminal such as a digital TV, a desktop computer, and the like. The electronic device shown in FIG. 14 is merely an example and should not bring any limitation to the functions and scope of use of the embodiments of the present disclosure.

As shown in FIG. 14, the electronic device 900 may include a processing device (e.g., a central processing unit, a graphics processing unit, etc.) 901 that may perform various suitable actions and processes in accordance with a program stored in read only memory (ROM) 902 or a program loaded into random access memory (RAM) 903 from storage 908. In the RAM 903, various programs and data necessary for the operation of the electronic device 900 are also stored. The processing apparatus 901, the ROM 902, and the RAM 903 are connected to each other via a bus 904. An input/output (I/O) interface 905 is also connected to the bus 904.

In general, the following devices may be connected to the I/O interface 905: an input device 906 including, for example, a touch screen, a touch pad, a keyboard, a mouse, a camera, a microphone, an accelerometer, a gyroscope, or the like; an output device 907 including, for example, a liquid crystal display (LCD), a speaker, a vibrator, or the like; a storage device 908 including, for example, a magnetic tape, a hard disk, or the like; and a communication device 909. A communication device 909 may allow the electronic device 900 to communicate wirelessly or wired with other devices to exchange data. While FIG. 14 illustrates an electronic device 900 with a variety of devices, it should be understood that it is not required that all of the illustrated devices be implemented or provided. More or fewer devices may alternatively be implemented or provided.

In particular, the processes described above with reference to the flowcharts may be implemented as computer software programs in accordance with embodiments of the present disclosure. For example, embodiments of the present disclosure include a computer program product comprising a computer program carried on a computer readable medium. The computer program comprises program code for executing the method as shown in the flowcharts. In such an embodiment, the computer program may be downloaded and installed from the network via the communication device 909, or installed the from storage device 908, or installed from the ROM 902. When the computer program is executed by the processing device 901, the above-described functions defined in the method of embodiments of the present disclosure are executed.

It should be noted that the computer readable medium in the present disclosure may be a computer readable signal medium or a computer readable storage medium, or any combination thereof. A computer-readable storage medium may be, for example, but not limited to, an electronic, magnetic, optical, electromagnetic, infrared, or semiconductor system, apparatus, or device, or any suitable combination of the foregoing. More specific examples of the computer readable storage medium may include, but are not limited to, an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the present disclosure, a computer readable storage medium may be any tangible medium that may contain or store a program for use by or in connection with an instruction execution system, apparatus, or device.

The computer readable medium may be included in the electronic device, or may exist separately and not be installed in the electronic device.

The computer readable medium carries one or more programs, and when the one or more programs are executed by the electronic device, the electronic device is enabled to execute the method shown in the foregoing embodiments.

Computer program code for carrying out operations for aspects of the present disclosure may be written in any combination of one or more programming languages, including an object-oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, may be implemented by special purpose hardware-based systems that perform the specified functions or acts, or combinations of special purpose hardware and computer instructions.

The unit(s) involved in the embodiments of the present disclosure may be implemented through software or hardware. The name of a unit does not constitute a limitation to the unit itself in some cases, for example, the first acquisition unit may also be described as "unit to acquire at least two internet protocol addresses".

The functions described herein above may be performed, at least in part, by one or more hardware logic components. For example, without limitation, exemplary types of hardware logic components that may be used include Field-programmable Gate Arrays (FPGAs), Application Specific Integrated Circuits (ASICs), Application Specific Standard Products (ASSPs), System-on-chip systems (SOCs), Complex Programmable Logic Devices (CPLDs), etc.

In the context of this disclosure, a machine-readable medium may be a tangible medium that may contain or store a program for use by or in connection with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination of the foregoing. More specific examples of machine-readable storage media would include an electrical connection based on one or more wires, a portable computer diskette, a hard disk, a random access memory (RAM), a read-only memory (ROM), an erasable programmable read-only memory (EPROM or Flash memory), an optical fiber, a compact disc read-only memory (CD-ROM), an optical storage device, a magnetic storage device, or any suitable combination of the foregoing.

In a first aspect, according to one or more embodiments of the present disclosure, a method for storing data is provided, including:

reading, from a message queue, target data to be stored in a current cycle, and extracting a first data feature of the target data, the first data feature representing a data volume of the target data; determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and writing, by invoking the data write component, the target data into a corresponding storage engine based on the data shard information, wherein the storage engine supports query processing of the target data.

According to one or more embodiments of the present disclosure, the method further comprises: querying, from the configuration center, whether the target data is registered with a pre-aggregation rule; in accordance with a determination that the target data is registered with the pre-aggregation rule, obtaining pre-aggregated data by performing pre-aggregation processing on the target data based on the pre-aggregation rule, wherein the number of data dimensions of the aggregated data is less than the number of data dimensions of the target data; and writing, by invoking the data write component, the pre-aggregated data into the corresponding storage engine based on the data shard information, wherein the storage engine supports query processing for the pre-aggregated data.

According to one or more embodiments of the present disclosure, the target data is time series data, and obtaining the pre-aggregated data by performing pre-aggregation processing on the target data based on the pre-aggregation rule comprises: acquiring data generation timestamps corresponding to the time series data; and performing, based on the data generation timestamps and the pre-aggregation rule, the pre-aggregation processing on the target data to obtain the pre-aggregated data, wherein the pre-aggregation rule is a rule for aggregating time series data based on a time dimension.

According to one or more embodiments of the present disclosure, the method further comprises: receiving a first query instruction for the pre-aggregated data; acquiring, based on the first query instruction, the pre-aggregation rule corresponding to the pre-aggregation data from the configuration center; and acquiring the pre-aggregation data from the search engine based on the pre-aggregation rule corresponding to the pre-aggregation data.

According to one or more embodiments of the present disclosure, the method further comprises: receiving a second query instruction for the target data; querying, by invoking the adaptive consistent hashing processing module, the configuration center to obtain the data shard information of the target data; and performing, by invoking a data query component, a data query based on the data shard information of the target data to obtain the target data.

According to one or more embodiments of the present disclosure, determining, by invoking the adaptive consistent hashing processing module, the data shard information matching the target data based on the first data feature comprises: determining a target shard number based on the first data feature; processing, by invoking the adaptive consistent hashing processing module, the target data to obtain a target storage engine corresponding to the target shard number; and generating the data shard information based on an engine identification of the target storage engine.

According to one or more embodiments of the present disclosure, processing, by invoking the adaptive consistent hashing processing module, the target data to obtain the target storage engine corresponding to the target shard number comprises: obtaining a first target data dimension of the target data based on target shard number; and processing, based on a consistent hashing algorithm, data in the target data that is in the first target data dimension to obtain the target storage engine.

According to one or more embodiments of the present disclosure, obtaining the first target data dimension of the target data based on target shard number comprises: in response to the target shard number being equal to 1, determining that the first target data dimension is a first dimension, and data in the first dimension represents a data category of the target data; and in response to the target shard number being greater than 1, determining that the first target data dimension is the first dimension and at least one second dimension, and data in the second dimension represents a single index of the target data.

According to one or more embodiments of the present disclosure, in response to the first target data dimension being the first dimension and the at least one second dimension, processing, based on the consistent hashing algorithm, the data in the target data that is in the first target data dimension to obtain the target storage engine comprises: obtaining a first storage engine based on data in the target data that is in the first dimension; obtaining a second storage engine based on data in the target data that is in the second dimension, wherein the first and second storage engines belong to a same storage cluster, and the second storage engine is an adjacent downstream logic node or an adjacent downstream physical node of the first storage engine; and obtaining the target storage engine based on the first and second storage engines.

According to one or more embodiments of the present disclosure, the target data comprises at least one data record, and processing, based on a consistent hashing algorithm, the data in the target data that is in the first target data dimension to obtain the target storage engine comprises: acquiring data of the data record in the target data that is in the first target data dimension; and calculating, by invoking the consistent hashing algorithm, the data of the data record that is in the first target data dimension to obtain the target storage engine corresponding to the data record.

According to one or more embodiments of the present disclosure, calculating, by invoking the consistent hashing algorithm, the data of the data record that is in the first target data dimension to obtain the target storage engine corresponding to the data record comprises: acquiring first data of the data record in a first dimension, and calculating the first data based on a target hashing algorithm to obtain a first hash value; acquiring second data of the data record in at least one second dimension, and calculating the second data in the at least one second dimension based on the target hashing algorithm to obtain a second hash value; performing a modulo operation on a predetermined hash ring length by using the first hash value and the second hash value, respectively, to obtain a first hash ring location corresponding to the first hash value and a second hash ring location corresponding to the second hash value; and obtaining a target storage engine corresponding to the data record based on a sum of the first and second hash ring locations.

According to one or more embodiments of the present disclosure, the first data feature comprises a dimension of a data record in the target data.

According to one or more embodiments of the present disclosure, the target data is time series data, and extracting the first data feature of the target data comprises: detecting, based on a first interval duration, a generation rate of the time series data within a current time period; and obtaining the first data feature based on the generation rate.

In a second aspect, according to one or more embodiments of the present disclosure, an apparatus for storing data, comprising:
   an extraction unit configured for reading, from a message queue, target data to be stored in a current cycle, and extracting a first data feature of the target data, the first data feature representing a data volume of the target data;
   a processing unit configured for determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and a storage unit configured for writing, by invoking the data write component, the target data into a corresponding storage engine based on the data shard information, wherein the storage engine supports query processing of the target data.

According to one or more embodiments of the present disclosure, the storage unit is further configured for: querying, from the configuration center, whether the target data is registered with a pre-aggregation rule; in accordance with a determination that the target data is registered with the pre-aggregation rule, obtaining pre-aggregated data by performing pre-aggregation processing on the target data based on the pre-aggregation rule, wherein the number of data dimensions of the aggregated data is less than the number of data dimensions of the target data; and writing, by invoking the data write component, the pre-aggregated data into the corresponding storage engine based on the data shard information, wherein the storage engine supports query processing for the pre-aggregated data.

According to one or more embodiments of the present disclosure, the target data is time series data, and when obtaining the pre-aggregated data by performing pre-aggregation processing on the target data based on the pre-aggregation rule, the storage unit is specifically configured for: acquiring data generation timestamps corresponding to the time series data; and performing, based on the data generation timestamps and the pre-aggregation rule, the pre-aggregation processing on the target data to obtain the pre-aggregated data, wherein the pre-aggregation rule is a rule for aggregating time series data based on a time dimension.

According to one or more embodiments of the present disclosure, the storage unit is further configured for: receiving a first query instruction for the pre-aggregated data; acquiring, based on the first query instruction, the pre-aggregation rule corresponding to the pre-aggregation data from the configuration center; and acquiring the pre-aggregation data from the search engine based on the pre-aggregation rule corresponding to the pre-aggregation data.

According to one or more embodiments of the present disclosure, the storage unit is further configured for: receiving a second query instruction for the target data; querying, by invoking the adaptive consistent hashing processing module, the configuration center to obtain the data shard information of the target data; and performing, by invoking a data query component, a data query based on the data shard information of the target data to obtain the target data.

According to one or more embodiments of the present disclosure, the processing unit is specifically configured for: determining a target shard number based on the first data feature; processing, by invoking the adaptive consistent hashing processing module, the target data to obtain a target storage engine corresponding to the target shard number; and generating the data shard information based on an engine identification of the target storage engine.

According to one or more embodiments of the present disclosure, when processing, by invoking the adaptive consistent hashing processing module, the target data to obtain the target storage engine corresponding to the target shard number, the processing unit is specifically configured for: obtaining a first target data dimension of the target data based on target shard number; and processing, based on a consistent hashing algorithm, data in the target data that is in the first target data dimension to obtain the target storage engine.

According to one or more embodiments of the present disclosure, when obtaining the first target data dimension of the target data based on target shard number, the processing unit is specifically configured for: in response to the target shard number being equal to 1, determining that the first target data dimension is a first dimension, and data in the first dimension represents a data category of the target data; and in response to the target shard number being greater than 1, determining that the first target data dimension is the first dimension and at least one second dimension, and data in the second dimension represents a single index of the target data.

According to one or more embodiments of the present disclosure, in response to the first target data dimension being the first dimension and the at least one second dimension, when processing, based on the consistent hashing algorithm, the data in the target data that is in the first target data dimension to obtain the target storage engine, the processing unit is specifically configured for: obtaining a first storage engine based on data in the target data that is in the first dimension; obtaining a second storage engine based on data in the target data that is in the second dimension, wherein the first and second storage engines belong to a same storage cluster, and the second storage engine is an adjacent downstream logic node or an adjacent downstream physical node of the first storage engine; and obtaining the target storage engine based on the first and second storage engines.

According to one or more embodiments of the present disclosure, the target data comprises at least one data record, and when processing, based on a consistent hashing algorithm, the data in the target data that is in the first target data dimension to obtain the target storage engine, the processing unit is specifically configured for: acquiring data of the data record in the target data that is in the first target data dimension; and calculating, by invoking the consistent hashing algorithm, the data of the data record that is in the first target data dimension to obtain the target storage engine corresponding to the data record.

According to one or more embodiments of the present disclosure, when calculating, by invoking the consistent hashing algorithm, the data of the data record that is in the first target data dimension to obtain the target storage engine corresponding to the data record, the processing unit is specifically configured for: acquiring first data of the data record in a first dimension, and calculating the first data based on a target hashing algorithm to obtain a first hash value; acquiring second data of the data record in at least one second dimension, and calculating the second data in the at least one second dimension based on the target hashing algorithm to obtain a second hash value; performing a modulo operation on a predetermined hash ring length by using the first hash value and the second hash value, respectively, to obtain a first hash ring location corresponding to the first hash value and a second hash ring location corresponding to the second hash value; and obtaining a target storage engine corresponding to the data record based on a sum of the first and second hash ring locations.

According to one or more embodiments of the present disclosure, the first data feature comprises a dimension of a data record in the target data.

According to one or more embodiments of the present disclosure, the target data is time series data, and when extracting the first data feature of the target data, the extracting unit is specifically configured for: detecting, based on a first interval duration, a generation rate of the time series data within a current time period; and obtaining the first data feature based on the generation rate.

In a third aspect, according to one or more embodiments of the present disclosure, there is provided an electronic device, comprising: a processor and a memory communicatively connected to the processor;

the memory stores computer executable instructions;

the processor executes the computer executable instructions stored in the memory to implement a method for storing data in accordance with the foregoing first aspect and various possible designs of the first aspect.

In a fourth aspect, according to one or more embodiments of the present disclosure, a computer readable storage medium with computer executable instructions stored thereon is provided. The computer executable instructions, when being executed by a processor, implement a method for storing data in accordance with the first aspect and various possible designs of the first aspect.

In a fifth aspect, an embodiment of the present disclosure provides a computer program product comprising a computer program, wherein the computer program, when being executed by a processor, implements a method for storing data in accordance with the first aspect and various possible designs of the first aspect.

The foregoing description is merely illustrative of the preferred embodiments of the present disclosure and of the technical principles applied thereto, as will be appreciated by those skilled in the art. The disclosure of the present disclosure is not limited to the technical solution formed by the specific combination of the described technical features. At the same time, it should also cover other technical solutions formed by any combination of the described technical features or equivalent features thereof without departing from the described disclosed concept. For example, the above features and technical features having similar functions disclosed in the present disclosure (but not limited thereto) are replaced with each other to form a technical solution.

In addition, while operations are depicted in a particular order, this should not be understood as requiring that the operations be performed in the particular order shown or in sequential order. Multitasking and parallel processing may be advantageous in certain circumstances. Likewise, while several specific implementation details are included in the above discussion, these should not be construed as limiting the scope of the present disclosure. Certain features that are described in the context of separate embodiments may also be implemented in combination in a single embodiment. Conversely, various features that are described in the context of a single embodiment may also be implemented in multiple embodiments separately or in any suitable sub-combination.

Although the subject matter has been described in language specific to structural features and/or methodological acts, it is to be understood that the subject matter defined in the appended claims is not necessarily limited to the specific features or acts described above. On the contrary, the specific features and acts described above are merely exemplary forms of implementing the claims.

What is claimed is:

1. A method for storing data, comprising:
reading, from a message queue, target data to be stored in a current cycle, and extracting a first data feature of the target data, the first data feature representing a data volume of the target data;
determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and
writing, by invoking the data write component, the target data into a corresponding storage engine based on the data shard information, wherein the storage engine supports query processing of the target data.

2. The method of claim 1, further comprising:
querying, from the configuration center, whether the target data is registered with a pre-aggregation rule;
in accordance with a determination that the target data is registered with the pre-aggregation rule, obtaining pre-aggregated data by performing pre-aggregation processing on the target data based on the pre-aggregation rule, wherein a number of data dimensions of the pre-aggregated data is less than a number of data dimensions of the target data; and
writing, by invoking the data write component, the pre-aggregated data into the corresponding storage engine based on the data shard information, wherein the storage engine supports query processing for the pre-aggregated data.

3. The method of claim 2, wherein the target data is time series data, and obtaining the pre-aggregated data by performing pre-aggregation processing on the target data based on the pre-aggregation rule comprises:
acquiring data generation timestamps corresponding to the time series data; and
performing, based on the data generation timestamps and the pre-aggregation rule, the pre-aggregation processing on the target data to obtain the pre-aggregated data, wherein the pre-aggregation rule is a rule for aggregating time series data based on a time dimension.

4. The method of claim 3, further comprising:
receiving a first query instruction for the pre-aggregated data;
acquiring, based on the first query instruction, the pre-aggregation rule corresponding to the pre-aggregation data from the configuration center; and
acquiring the pre-aggregation data from a search engine based on the pre-aggregation rule corresponding to the pre-aggregation data.

5. The method of claim 1, further comprising:
receiving a second query instruction for the target data;
querying, by invoking the adaptive consistent hashing processing module, the configuration center to obtain the data shard information of the target data; and
performing, by invoking a data query component, a data query based on the data shard information of the target data to obtain the target data.

6. The method of claim 1, wherein determining, by invoking the adaptive consistent hashing processing module, the data shard information matching the target data based on the first data feature comprises:
determining a target shard number based on the first data feature;
processing, by invoking the adaptive consistent hashing processing module, the target data to obtain a target storage engine corresponding to the target shard number; and
generating the data shard information based on an engine identification of the target storage engine.

7. The method of claim 6, wherein processing, by invoking the adaptive consistent hashing processing module, the target data to obtain the target storage engine corresponding to the target shard number comprises:
    obtaining a first target data dimension of the target data based on target shard number; and
    processing, based on a consistent hashing algorithm, data in the target data that is in the first target data dimension to obtain the target storage engine.

8. The method of claim 7, wherein obtaining the first target data dimension of the target data based on target shard number comprises:
    in response to the target shard number being equal to 1, determining that the first target data dimension is a first dimension, and data in the first dimension represents a data category of the target data; and
    in response to the target shard number being greater than 1, determining that the first target data dimension is the first dimension and at least one second dimension, and data in the second dimension represents a single index of the target data.

9. The method of claim 8, wherein in response to the first target data dimension being the first dimension and the at least one second dimension, processing, based on the consistent bashing algorithm, the data in the target data that is in the first target data dimension to obtain the target storage engine comprises:
    obtaining a first storage engine based on data in the target data that is in the first dimension;
    obtaining a second storage engine based on data in the target data that is in the second dimension, wherein the first and second storage engines belong to a same storage cluster, and the second storage engine is an adjacent downstream logic node or an adjacent downstream physical node of the first storage engine; and
    obtaining the target storage engine based on the first and second storage engines.

10. The method of claim 7, wherein the target data comprises at least one data record, and processing, based on the consistent hashing algorithm, the data in the target data that is in the first target data dimension to obtain the target storage engine comprises:
    acquiring data of the data record in the target data that is in the first target data dimension; and
    calculating, by invoking the consistent hashing algorithm, the data of the data record that is in the first target data dimension to obtain the target storage engine corresponding to the data record.

11. The method of claim 10, wherein calculating, by invoking the consistent hashing algorithm, the data of the data record that is in the first target data dimension to obtain the target storage engine corresponding to the data record comprises:
    acquiring first data of the data record in a first dimension, and calculating the first data based on a target hashing algorithm to obtain a first hash value;
    acquiring second data of the data record in at least one second dimension, and calculating the second data in the at least one second dimension based on the target hashing algorithm to obtain a second hash value;
    performing a modulo operation on a predetermined hash ring length by using the first hash value and the second hash value, respectively, to obtain a first hash ring location corresponding to the first hash value and a second hash ring location corresponding to the second hash value; and
    obtaining a target storage engine corresponding to the data record based on a sum of the first and second hash ring locations.

12. The method of claim 1, wherein the first data feature comprises a dimension of a data record in the target data.

13. The method of claim 1, wherein the target data is time series data, and extracting the first data feature of the target data comprises:
    detecting, based on a first interval duration, a generation rate of the time series data within a current time period; and
    obtaining the first data feature based on the generation rate.

14. An electronic device, comprising a processor and a memory communicatively connected to the processor,
    wherein the memory stores computer executable instructions, and
    the processor executes the computer executable instructions stored in the memory to perform acts comprising:
        reading, from a message queue, target data to be stored in a current cycle, and extracting a first data feature of the target data, the first data feature representing a data volume of the target data;
        determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and
        writing, by invoking the data write component, the target data into a corresponding storage engine based on the data shard information, wherein the storage engine supports query processing of the target data.

15. The electronic device of claim 14, wherein the acts further comprise:
    querying, from the configuration center, whether the target data is registered with a pre-aggregation rule;
    in accordance with a determination that the target data is registered with the pre-aggregation rule, obtaining pre-aggregated data by performing pre-aggregation processing on the target data based on the pre-aggregation rule, wherein a number of data dimensions of the pre-aggregated data is less than a number of data dimensions of the target data; and
    writing, by invoking the data write component, the pre-aggregated data into the corresponding storage engine based on the data shard information, wherein the storage engine supports query processing for the pre-aggregated data.

16. The electronic device of claim 14, wherein the acts further comprise:
    receiving a second query instruction for the target data,
    querying, by invoking the adaptive consistent hashing processing module, the configuration center to obtain the data shard information of the target data; and
    performing, by invoking a data query component, a data query based on the data shard information of the target data to obtain the target data.

17. The electronic device of claim 14, wherein determining, by invoking the adaptive consistent hashing processing module, the data shard information matching the target data based on the first data feature comprises:
    determining a target shard number based on the first data feature;

processing, by invoking the adaptive consistent hashing processing module, the target data to obtain a target storage engine corresponding to the target shard number; and generating the data shard information based on an engine identification of the target storage engine.

18. The electronic device of claim 14, wherein the first data feature comprises a dimension of a data record in the target data.

19. The electronic device of claim 14, wherein the target data is time series data, and extracting the first data feature of the target data comprises:
    detecting, based on a first interval duration, a generation rate of the time series data within a current time period; and
    obtaining the first data feature based on the generation rate.

20. A non-transitory computer readable storage medium with computer executable instructions stored thereon, wherein the computer executable instructions, when being executed by a processor, implement acts comprising:

reading, from a message queue, target data to be stored in a current cycle, and extracting a first data feature of the target data, the first data feature representing a data volume of the target data;

determining, by invoking an adaptive consistent hashing processing module and based on the first data feature, data shard information matching the target data, and synchronizing the data shard information matching the target data to a configuration center, wherein the data shard information indicates at least one storage engine storing the target data in shards, and the configuration center records the data shard information and refreshes the data shard information to a data write component regularly; and writing, by invoking the data write component, the target data into a corresponding storage engine based on the data shard information, wherein the storage engine supports query processing of the target data.

* * * * *